Figure 1:
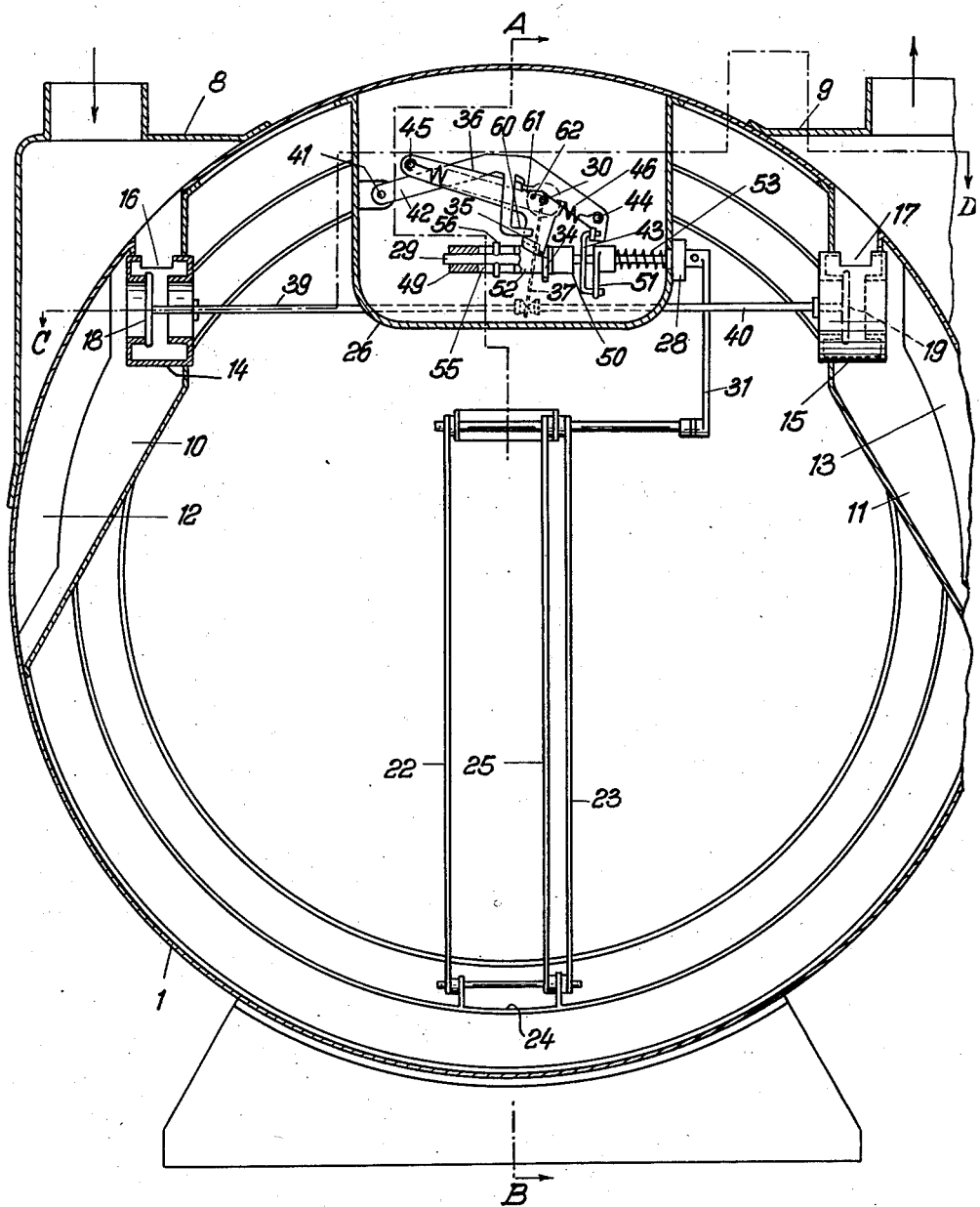

May 11, 1937.   W. HOLM   2,080,044
REVERSING MECHANISM FOR DRY GAS METERS
Filed Aug. 6, 1936   4 Sheets-Sheet 1

Inventor:
W. Holm
Barry & Cyr — Attys.

May 11, 1937.    W. HOLM    2,080,044
REVERSING MECHANISM FOR DRY GAS METERS
Filed Aug. 6, 1936    4 Sheets-Sheet 3

Inventor:
W. Holm
Barry & Cyr - Attys.

May 11, 1937. W. HOLM 2,080,044
REVERSING MECHANISM FOR DRY GAS METERS
Filed Aug. 6, 1936 4 Sheets-Sheet 4
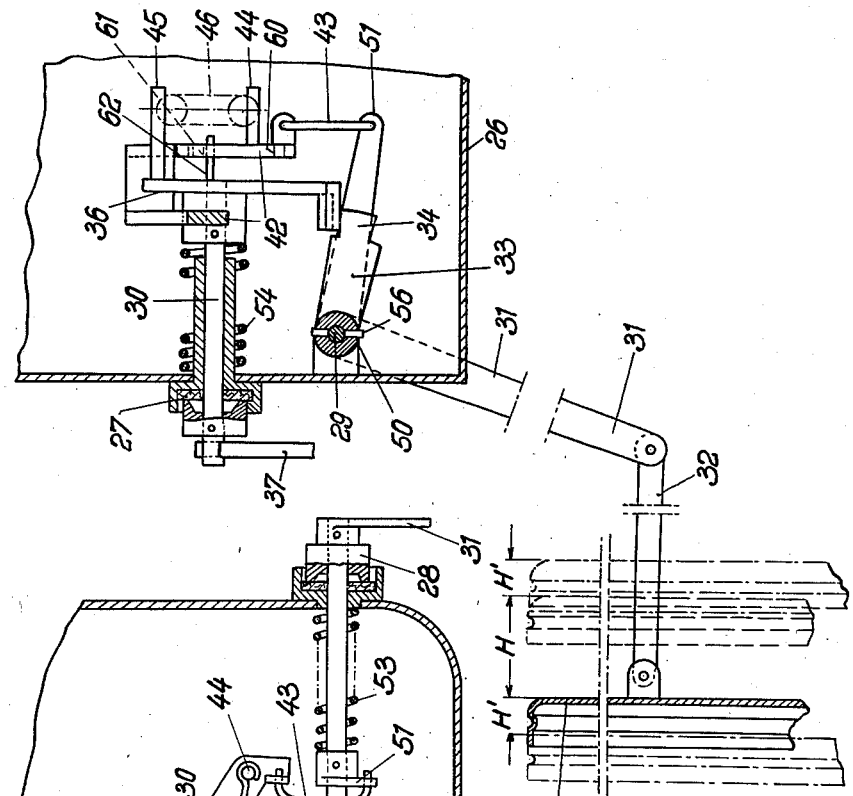
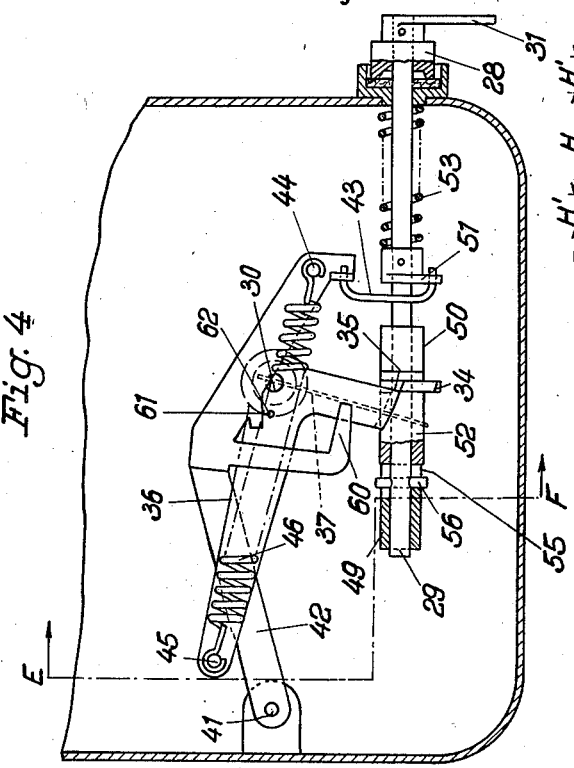
Inventor:
W. Holm
Barry & Gyr - Attys.

UNITED STATES PATENT OFFICE 2,080,044

REVERSING MECHANISM FOR DRY GAS METERS

Waldemar Holm, Furstenwalde-on-the-Spree, Germany, assignor to Julius Pintsch Aktiengesellschaft, Berlin, Germany Application August 6, 1936, Serial No. 94,710
In Germany August 22, 1935

2 Claims. (Cl. 73—270)

The invention relates to dry gas meters of the known type in which the movement of the diaphragm is transmitted to a reversing mechanism which reverses suddenly the valves of the gas meter at the end of the strokes of the diaphragm.

The present invention in certain of its aspects constitutes an improvement upon the reversing mechanism constituting the subjects of my U. S. Letters Patent No. 2,006,101 and of my prior application for Letters Patent filed July 2nd, 1936, Serial No. 88,682.

The present invention has for its object to ensure the reversal of the valves of the gas meter even if their seats are soiled for instance by sticky deposits from the gas flowing through the meter, in which case the energy stored in the reversing spring of the reversing mechanism is not sufficient to lift the valves from their seats. This energy is bound to a certain limit as it must be originated by the gas flowing through the meter and if too large would entail a high loss of pressure. If the valves, however, stick on their seats and cannot be lifted by the reversing mechanism, the diaphragm will continue its way until it strikes against the wall of the respective measuring chamber, whereupon it will come to a stop and the flow of the gas through the meter is interrupted.

According to this invention this disadvantage is overcome by utilizing the excessive stroke of the diaphragm which takes place if the valves are not reversed in time by the reversing mechanism. This excessive stroke is transmitted by suitable means to the valves which consequently are reversed with a power which corresponds to the product of the effective area of the diaphragm and of the difference between the gas pressures in the measuring chambers separated from each other by the diaphragm. The excessive stroke in no way impairs the accuracy of the indication of the counting mechanism, provided same is taking into account the length of the stroke of the diaphragm, as is the case with the gas meter to which this invention relates, and thereby indicates also the quantity of gas which passes the meter during the excessive stroke of the diaphragm.

The transmission of the excessive stroke of the diaphragm to the valves in case same stick to their seats is effected in the following way. The suspension lever which carries the one end of the reversing spring and is coupled to the guide lever which is driven by the diaphragm is provided with two abutments adapted to engage with a pin on the tilting lever, the latter carrying the other end of the reversing spring and being coupled to the valve spindles. The distance between these abutments is large enough to prevent same from coming into contact with the pin on the tilting lever if same as normally is the case tilts over as soon as its snap member is released by the counter snap member of the guide lever. If, however, this reversal does not occur the suspension lever which is driven by the diaphragm by means of one of its abutments and of the pin on the tilting lever takes the tilting lever along with it and reverses the valves.

It has already been proposed to diminish the danger of a shutdown of the gas meter caused by the sticking of the valves on their seats by transmitting the power of the reversing spring to the valves in this case over a lever arm which is longer than the one over which this power is transmitted under normal conditions. This makes the reversal of the valves more reliable to a degree corresponding to the ratio of the lever arms to each other. The lever arm over which the power of the reversing spring is transmitted, however, is subject to a certain limit, first on account of the space required by this enlarged lever arm and further because the stroke of the point at which the movement of this lever arm is transmitted to the valves becomes all the smaller the longer the lever arm is. If this stroke is too small the leather discs constituting the valve plates will yield without the valves proper being broken away from their seats. By this known method, therefore, the reversing of the valves is made somewhat more reliable; an absolute reliability, however, is not attained.

In the reversing mechanism according to this invention the reversing of the valves is ensured by exercising an additional power on the valves by coupling the tilting lever with the suspension lever which is driven by the diaphragm during its excessive stroke. This power corresponds to the product of the effective area of the diaphragm and the difference between the pressures on both sides of the diaphragm which difference can increase up to the full supply pressure of the gas; the power, therefore, is under all conditions high enough to reverse the valves of the gas meter.

The invention will now be described with reference to the accompanying drawings in which—

Figure 2:
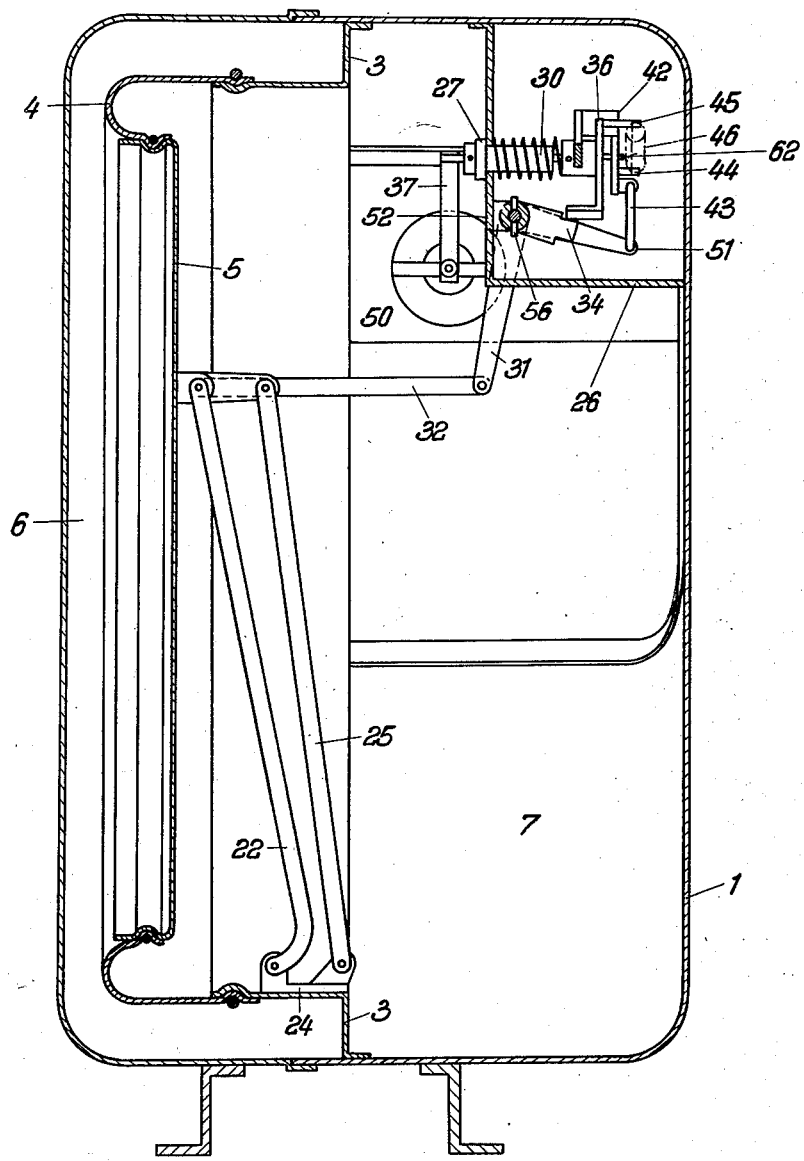
Figure 3:
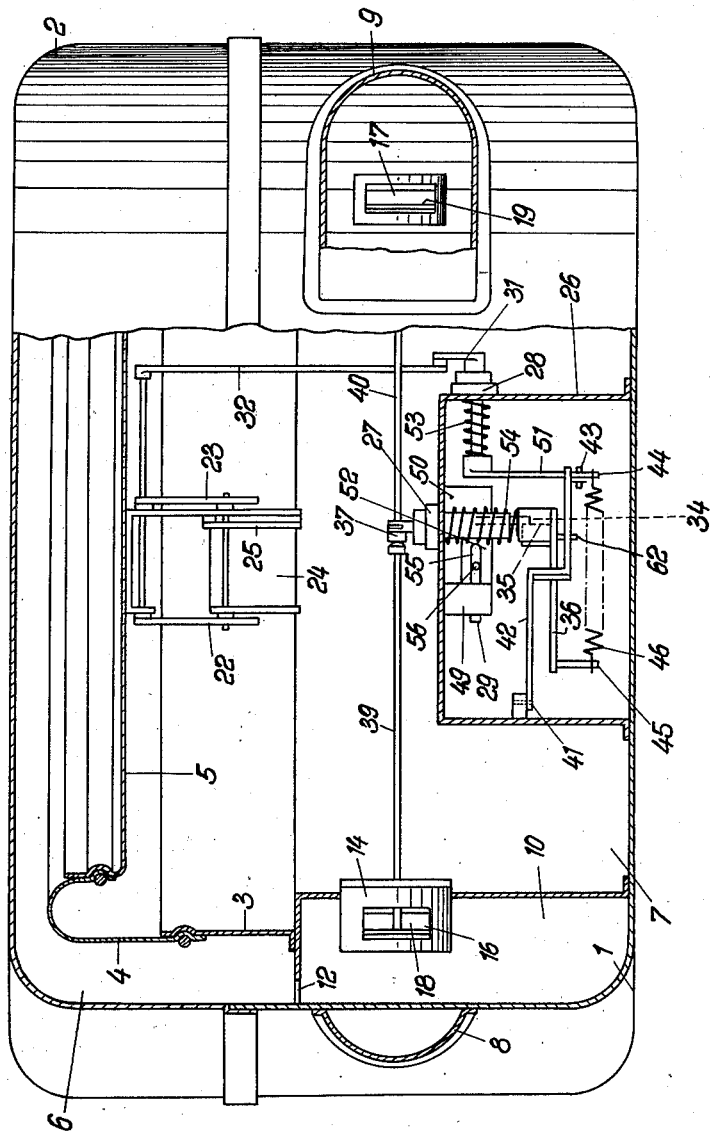

Fig. 1 shows a gas meter provided with a reversing mechanism according to this invention, the front plate of the gas meter housing being removed, Fig. 2 is a section through the gas meter taken along the line AB in Fig. 1, Fig. 3 is a section taken along line CD of Fig. 1, Fig. 4 shows the reversing mechanism in an enlarged scale, Fig. 5 is a section taken along the line EF in Fig. 4.

The gas meter housing consists of the front casing 1 and the back casing 2. Inside the front casing 1 there is provided the diaphragm ring 3 carrying the diaphragm 4 which diaphragm is provided with the diaphragm plate 5. This ring together with the diaphragm divides the interior of the casing into two measuring chambers, the front measuring chamber 7 and the back measuring chamber 6. Below the connector casings 8 and 9 for the gas inlet and outlet respectively segment shaped chambers 10 and 11 are arranged which are connected by the openings 12 and 13 with the back measuring chamber 6. Each of these chambers is provided with a double seat valve housing (14 and 15). These valve housings have apertures 16 and 17 which communicate with the inlet connector casing 8 and the outlet connector casing 9 respectively. The outer seats of these valve housings connect same with the back measuring chamber 6, whereas the inner ones connect them with the front measuring chamber 7.

The operation of the gas meter is the following. In the position of the valves shown in the drawings the gas entering through the inlet passes the connector casing 8 and through the aperture 16 enters the valve housing 14. The inner seat being not covered by the valve disc 18 the gas enters the front measuring chamber 7. The diaphragm 5 thereby is moved towards the back of the gas meter and pushes the gas contained in the back measuring chamber 6 through the opening 13, the uncovered outer seat of the valve housing 15, aperture 17 and connector casing 9 to the outlet of the gas meter. When the diaphragm has finished its stroke in this direction the valves are reversed by the reversing mechanism referred to later on. Then the gas entering the gas meter passes through the outer valve seating of valve housing 14, and the opening 12 into the back measuring chamber 6, pushing the diaphragm back again. Thereby the gas in the front measuring chamber 7 is forced to leave the gas meter through the inner seating of the valve housing 15 and through the outlet connector casing 9. The diaphragm plate is guided by means of two levers 22 and 23 pivotally mounted on a bracket 24 arranged inside the diaphragm ring 3. A rod 25 ensures the guidance of the diaphragm plate 5 in parallel fashion.

Behind the front plate of the front casing 1 a gas tight box 26 is arranged containing the reversing mechanism and the counting mechanism. In the wall of this box two glands 27 and 28 are provided, one for leading through the shaft 29 by means of which the reversing mechanism is driven, the other one for leading through the shaft 30 by means of which the reversal is transmitted to the valves. The shafts 29 and 30 each are provided with springs 53 and 54 respectively by means of which the glands 28 and 27 are tightened so that no gas can enter the box 26. Outside the box 26 the shaft 29 carries a lever 31 which is connected to the diaphragm plate 5 by a link 32. Inside the box the shaft 29 carries the guide lever 33. This guide lever ends in a snap member 34, engaging with a corresponding snap member 35 on the tilting lever 36. This angular shaped tilting lever is fastened rigidly to the shaft 30. This shaft 30 carries outside the box 26 a leaf spring 37 engaging with the spindles 39, 40 of the two valves 18 and 19. At right angles to the shaft 29 a further shaft 41 is arranged in a suitable bearing which shaft carries the suspension lever 42. This lever is connected by means of the link 43 to the arm 51 fastened to the shaft 29. Between the free end 44 of the suspension lever 42 and the other end 45 of the tilting lever 36 the reversing spring 46 is suspended.

The guide lever 33 carrying the snap member 34 is provided with a hub 52 which rests on both ends against the bearings 49 and 50 of the shaft 29. The hub 52 of the guide lever 33 is provided with a slot in longitudinal direction. The pin 56 traversing the shaft 29 couples the hub 52 with this shaft in such a way, as to transmit the torque of the shaft 29 to the guide lever 33, but not the stress of the reversing spring 46 playing on the counter snap member 34, which is taken up instead by the bearings 49 and 50.

The operation of the reversing mechanism is the following. In the position shown in the drawings, the gas entering the front measuring chamber 7 will push the diaphragm, in the view shown in Fig. 2, to the left. By means of the link 32 the lever 31 is taken to the left, thus turning the shaft 29 and the guide lever 33. The suspending lever 42 coupled to the guide lever 33 by the link 43 pivots round its shaft 41. The tilting lever 36 during the stroke of the diaphragm remains in its position as its snap member 35 resting against the snap member 34 of the guide lever prevents it from moving. While the one point, 45, to which the spring 46 is attached therefore remains in its position, the other suspension point 44 is moving downwards, whereby the spring 46 becomes tensioned. During this movement the line of stress of the spring 46, line 44, 45 passes the shaft 30 (see Figs. 1 and 4). When the diaphragm has reached the end of its stroke, the snap member 34 of the guide lever 33 releases the snap member 35 of the tilting lever 36. Under the influence of the stress of the spring 46 which has become tensioned during the aforegoing stroke, the tilting lever 36 suddenly will tilt over, thereby turning the shaft 30. The leaf spring 37 imparts this movement to the spindles 39 and 40, whereby the valves 18 and 19 are reversed. In consequence of this the incoming gas now enters the back measuring chamber 6 thus pushing the diaphragm plate 5 back again. In the reverse operation the guide lever 33 and the suspension lever 42 are moving in opposite directions, while the tilting lever 36 is prevented from moving by its snap member 35 now resting against the other face of the snap member 34. The spring 46 is again tensioned and at the end of the stroke of the diaphragm when the snap member 35 is released again effects the reversal of the valves. A counting mechanism coupled to the shaft 29, which mechanism is not shown in the drawings in order not to complicate same too much, serves for indicating the quantity of gas that passed through the meter.

According to this invention the suspension lever 42 is provided with two abutments 60 and 61 adapted to engage with the pin 62 arranged on the tilting lever 36. The distance between the abutments 60 and 61 which can be varied by bending is so large that they do not come into contact with the pin 62 when the reversing of the valves takes place in the normal way.

The operation of the reversing mechanism in case the valves are sticking to their seats is the following. As the way of the gas through the meter remains unaltered the diaphragm continues its way in the direction of the preceding stroke H which thereby is amplified by the excessive stroke H'. During this excessive stroke H' the movement of the diaphragm plate 5 is transmitted to the valves 18 and 19 by means of the link 32, the lever 31, the link 43, the suspension lever 42, the abutments 60 or 61 respectively, the pin 62, the tilting lever 36, the leaf spring 37, and the valve spindles 39 and 40, and the valves are reversed with great force. In most of the cases a short lifting of the valves will do, the rest of the stroke of the valves being caused by the reversing spring 46.

I claim:

1. In a dry gas meter with one diaphragm adapted to carry out an excessive stroke and with two double seat valves provided with spindles, a reversing mechanism comprising a shaft actuated by the diaphragm, a guide lever on this shaft, a snap member on this guide lever, a second shaft, a tilting lever provided with two legs on said other shaft, a snap member on one of the legs of the tilting lever, adapted to cooperate with the snap member on the guide lever, a further shaft, a suspending lever on this shaft, means for operatively connecting the suspending lever with the guide lever, a reversing spring fastened on one end to the other leg of the tilting lever and on the other end to the suspending lever, means for transmitting the movement of the shaft of the tilting lever to the spindles of the double valves of the gas meter, and means for transmitting the excessive stroke of the diaphragm to the tilting lever.

2. In a dry gas meter with one diaphragm adapted to carry out an excessive stroke and with two double seat valves provided with spindles, a reversing mechanism comprising a shaft actuated by the diaphragm, a guide lever on this shaft, a snap member on this guide lever, a second shaft, a tilting lever provided with two legs on said other shaft, a pin on the tilting lever, a snap member on one of the legs of the tilting lever, adapted to cooperate with the snap member on the guide lever, a further shaft, a suspending lever on this shaft, two abutments on said suspending lever adapted to cooperate with said pin on the tilting lever, means for operatively connecting the suspending lever with the guide lever, a reversing spring fastened on one end to the other leg of the tilting lever and on the other end to the suspending lever, and means for transmitting the movement of the shaft of the tilting lever to the spindles of the double valves of the gas meter.

WALDEMAR HOLM.